(12) United States Patent
Hirota

(10) Patent No.: US 8,888,060 B2
(45) Date of Patent: Nov. 18, 2014

(54) DISPLAY DEVICE

(75) Inventor: Hideyuki Hirota, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 147 days.

(21) Appl. No.: 13/499,220

(22) PCT Filed: Jan. 26, 2010

(86) PCT No.: PCT/JP2010/000431
§ 371 (c)(1),
(2), (4) Date: Mar. 29, 2012

(87) PCT Pub. No.: WO2011/092730
PCT Pub. Date: Aug. 4, 2011

(65) Prior Publication Data
US 2012/0187262 A1     Jul. 26, 2012

(51) Int. Cl.
*G12B 9/10*     (2006.01)
*B60R 11/02*    (2006.01)
*B60R 11/00*    (2006.01)

(52) U.S. Cl.
CPC ..... B60R 11/0235 (2013.01); *B60R 2011/0005* (2013.01); *B60R 2011/0085* (2013.01); *B60R 2011/0082* (2013.01)
USPC ............ 248/201; 248/27.1; 361/679.21

(58) Field of Classification Search
CPC ........... B60R 11/0235; B60R 2011/0005; B60R 2011/0085; B60R 2011/0082; B60R 2011/0084; B60K 2350/405

USPC ........... 248/201, 27.1, 27.3, 202.1, 225.11, 248/274.1, 276.1, 281.11, 284.1, 298.1, 248/241, 240, 240.1, 267, 254; 361/679.21; 16/386
See application file for complete search history.

(56) References Cited

U.S. PATENT DOCUMENTS

| | | | | |
|---|---|---|---|---|
| 3,480,243 | A * | 11/1969 | Summerville, Jr. | 248/264 |
| 6,917,516 | B2 * | 7/2005 | Chou | 361/679.06 |
| 7,999,878 | B2 * | 8/2011 | Ito | 348/837 |
| 8,157,232 | B2 * | 4/2012 | Kasai | 248/284.1 |
| 8,387,929 | B2 * | 3/2013 | Lin et al. | 248/139 |
| 2004/0173714 | A1 * | 9/2004 | Nakamura et al. | 248/27.1 |
| 2005/0056734 | A1 * | 3/2005 | Lee | 248/27.3 |
| 2009/0212182 | A1 * | 8/2009 | Ding | 248/225.11 |

FOREIGN PATENT DOCUMENTS

| | | |
|---|---|---|
| CN | 1831345 A | 9/2006 |
| JP | 51-3335 | 1/1976 |
| JP | 2512631 Y2 | 10/1996 |
| JP | 2001-291967 A | 10/2001 |
| JP | 2004-210190 A | 7/2004 |
| JP | 2008-62809 A | 3/2008 |

* cited by examiner

*Primary Examiner* — Anita M King
(74) *Attorney, Agent, or Firm* — Birch, Stewart, Kolasch & Birch, LLP

(57) ABSTRACT

A connecting portion 21 (31) includes a hole portion 22 (33) and a shaft insertion portion 23 (34) that is cut in from an edge of an arm 2 (3) to the hole portion 22 (33) by a width smaller than a diameter of the hole portion 22 (33), and a post portion 42a (42b) includes a shaft 43a (43b) that is attachable to/detachable from the hole portion 22 (33) through the shaft insertion portion 23 (34) only from a predetermined direction when upper and lower arms 2 and 3 are projected to an extent not normally used, and a fixing portion 44a (44b) formed at both ends of the shaft 43a (43b) by a diameter larger than that of the hole portion 22 (33).

6 Claims, 3 Drawing Sheets

(a)

(b)

(a)

(b)

DISPLAY DEVICE

TECHNICAL FIELD

The present invention relates to a display device provided with a panel that is openably/closably disposed on the front side of a main body unit, for example.

BACKGROUND ART

A conventional display device includes a main body unit accommodating therein a control section for controlling operations of different sections of the display device and the like, and a panel openably/closably disposed on the front side of the main body unit. Further, post portions are provided at the upper and lower portions on the side of the panel, and are connected to upper and lower arms, respectively, to be protruded from/retracted into the main body to open and close the panel.

When the panel and the upper and lower arms are assembled, the post portion of the panel is aligned with a hole portion formed at the end portion of the arm, and then is screwed through the hole portion from outside of the arm (see Patent Document 1 for example).

PRIOR ART DOCUMENTS

Patent Documents

Patent Document 1: Japanese Patent Application Laid-open No. 2001-291967

SUMMARY OF THE INVENTION

In the conventional display device disclosed in Patent Document 1, however, the assembly of the panel and the upper and lower arms are performed by screws, and a reversing operation of a product is required to carry out the screwing operation on both right and left sides of the panel, which poses a problem such that the number of man-hours in the assembly of the product is increased. There is another problem such that the maintainability of the device is deteriorated.

The present invention has been made in order to solve the foregoing problems. An object of the invention is to provide a display device such that the assembly of the panel and the upper and lower arms can be easily performed and that the maintainability can be improved.

An aspect of the embodiments of a display device of the invention comprises: a lower arm having an end portion in which a connecting portion is formed to be projected from and retracted into a main body unit; an upper arm having an end portion in which a connecting portion is formed, and another end portion rotatably supported by the main body unit; and a panel with a side having a lower portion provided with a post portion for connection to the connecting portion of the lower arm is provided, and an upper portion provided with a post portion for connection to the connecting portion of the upper arm, the panel being openably/closably disposed on a front side of the main body unit, wherein both the connecting portions include a hole portion, and a shaft insertion portion that is cut in from an edge of the arm to the hole portion by a width smaller than a diameter of the hole portion, and wherein the post portion includes a shaft that is attachable to/detachable from the hole portion through the shaft insertion portion only from a predetermined direction when the upper and lower arms are projected to an extent not normally used, and a fixing portion formed at both ends of the shaft having a diameter larger than a diameter of the hole portion.

According to an aspect of the embodiments of a display device of the invention, the panel and the upper/lower arms are assembled easily, and steps for assembling members of the display device are reduced. Further, since the panel may be removed from the upper/lower arms by pulling out the upper/lower arms from the main body unit greater than the extent they are normally projected, the maintainability can be improved.

BRIEF DESCRIPTION OF THE DRAWINGS

FIGS. 1(a) and 1(b) are views showing a closed position and an opened position of the panel, respectively.

FIGS. 2(a) and 2(b) are a top plan view and a side elevational view thereof, respectively.

FIGS. 4(a) and 4(b) are views showing a connection between the panel and a lower arm, and a connection between the panel and an upper arm, respectively.

BEST MODE FOR CARRYING OUT THE INVENTION

In the following, embodiments of the present invention will be described in detail with reference to the accompanying drawings.

First Embodiment

Figure 1:
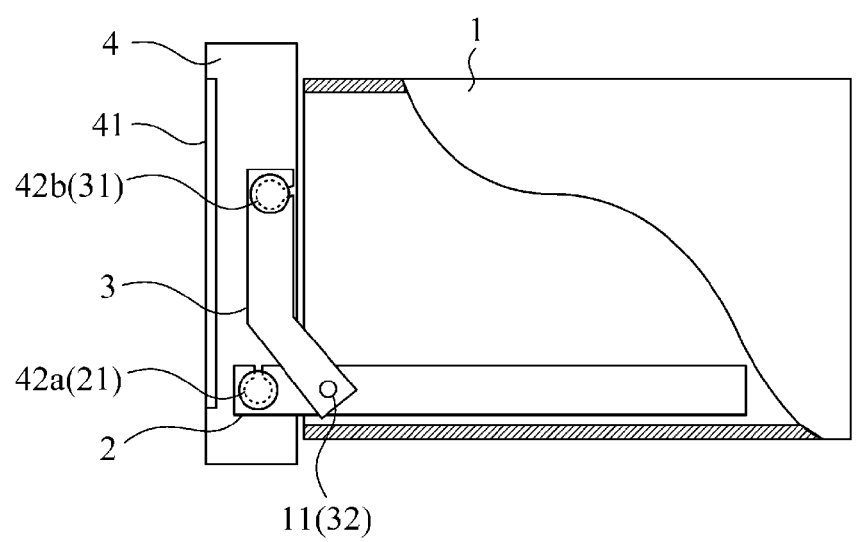
FIG. 1 illustrates a partial cross section of a configuration of a display device in accordance with a first embodiment of the present invention.
Figure 1:
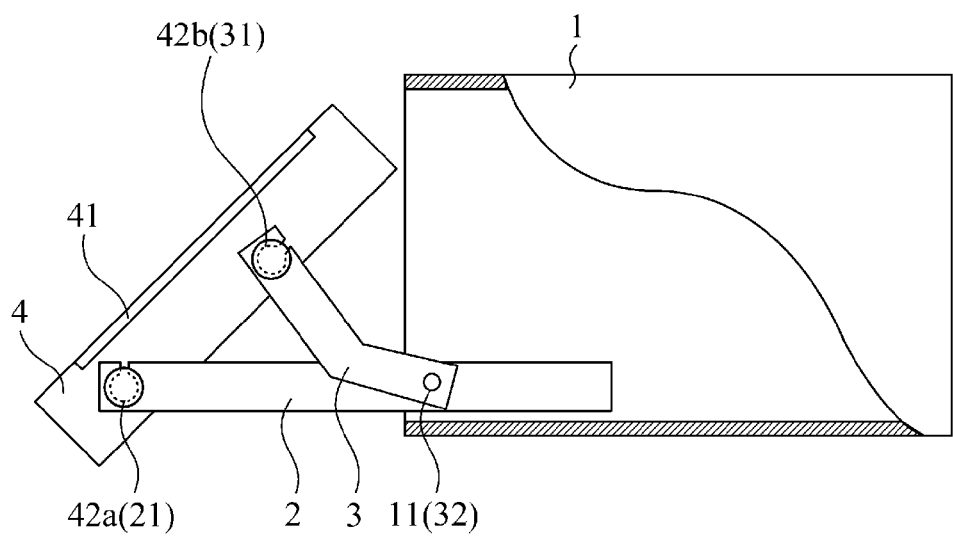

As shown in FIG. 1, a display device is composed of a main body unit 1, a lower arm 2, an upper arm 3, and a panel 4.

The main body unit 1 has accommodated therein a control section (not shown) for controlling operations of different sections of the panel apparatus, the lower arm 2, a guide mechanism (not shown) for projecting and retracting the lower arm 2, a motor, a gear, and the like. A pivot 11 for supporting rotatably the end portion of the upper arm 3 is formed on opposite internal sides of the main body unit 1. Further, as shown in FIG. 3, an abutment portion (excessive projection preventing mechanism) 12 for preventing an excessive projection of the lower arm 2 is formed on the opposite internal sides of the main body unit 1, and a window 13 for releasing the excessive projection preventing mechanism is formed on the opposite sides thereof.

The lower arm 2 is a sheet metal member to be connected to the lower portion on each of the opposite sides of the panel 4 one by one, and supported by a guide mechanism (not shown); a connecting portion 21 for connection to a post portion 42a (described later) is formed at the end portion of the arm 2. As shown in FIG. 2(b), the connecting portion 21 includes a hole portion 22, and a shaft insertion portion 23 that is cut in from an edge of the lower arm 2 to the hole portion 22 in a predetermined direction by a width smaller than the diameter of the hole portion 22.

When the end portion of the lower arm 2 is projected from and retracted into the main body unit 1 by the guide mechanism, the lower portion of the panel 4 is slid, so that the panel 4 is opened and closed with laid upward.

Figure 3:
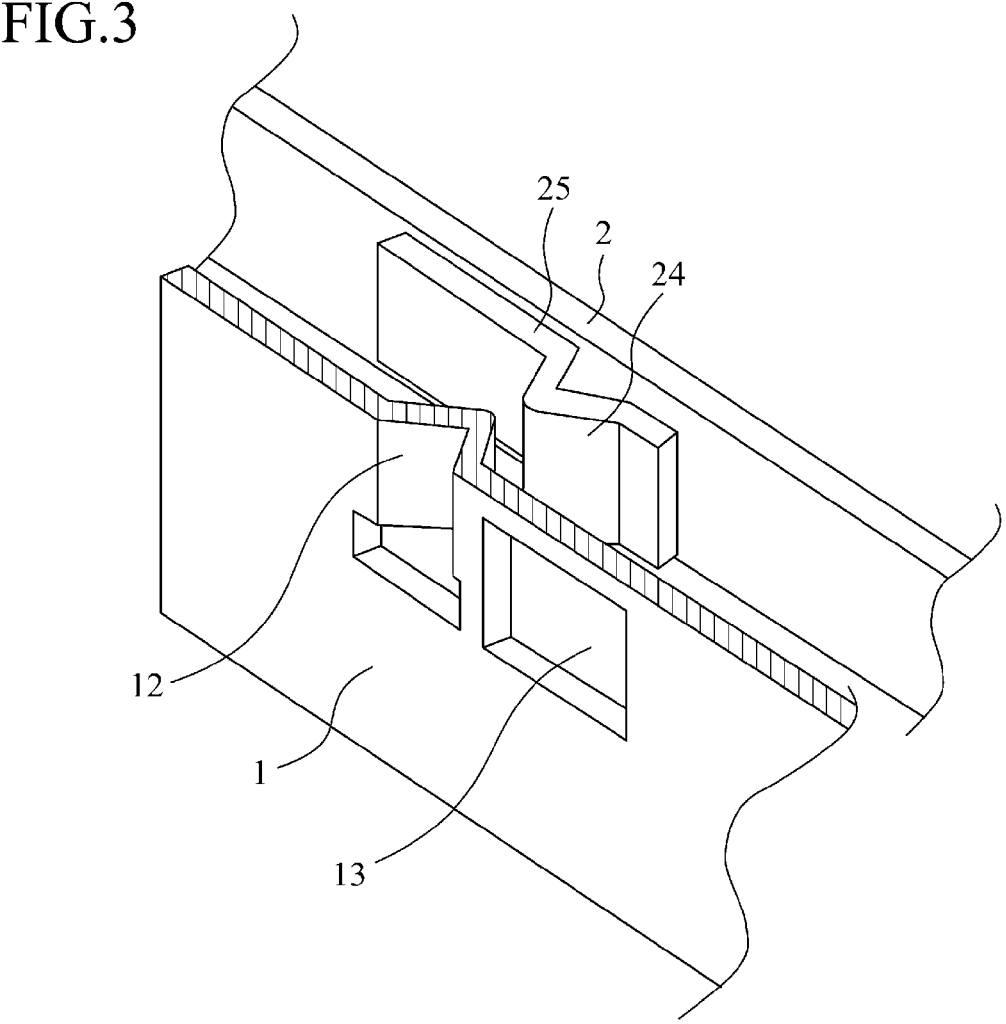
FIG. 3 is a partially cutout perspective view showing an excessive projection preventing mechanism in the first embodiment of the present invention.

On the other hand, as shown in FIG. 3, an excessive projection preventing member (excessive projection preventing mechanism) 25 in which a projecting portion 24 abuts against the abutment portion 12 when the lower arm 2 is projected excessively is provided on the outer side of the lower arm 2. The projecting portion 24 has elasticity; thus, when the lower arm 2 is projected excessively as the projecting portion 24 is pressed through the window 13, the projecting portion 24 can be passed without any abutment with the abutment portion 12, thereby releasing the excessive projection preventing mechanism.

Figure 2:
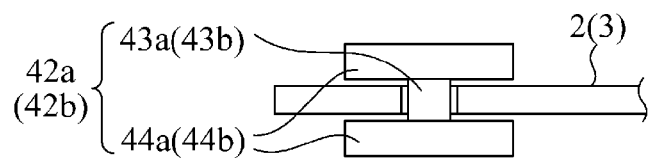
FIG. 2 illustrates a connecting portion and a post portion in the first embodiment of the invention.
Figure 2:
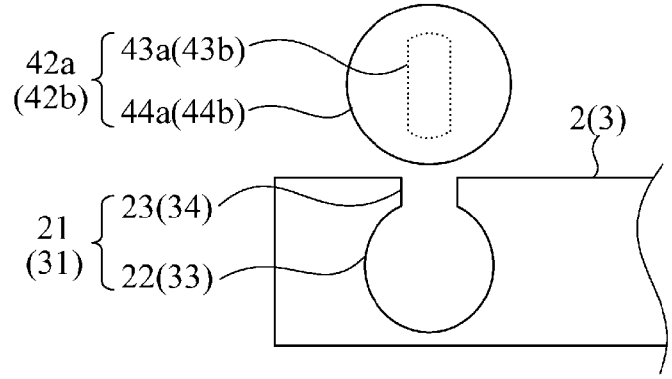

The upper arm 3 is a sheet metal member to be connected to the upper portion on each of the opposite sides of the panel 4 one by one; a connecting portion 31 for connection to a post portion 42*b* (described later) at the end portion of the arm is formed, and a hole portion 32 supported by the pivot 11 at the opposite end portion thereof is formed. As shown in FIG. 2(*b*), the connecting portion 31 includes a hole portion 33, and a shaft insertion portion 34 that is cut in from an edge of the upper arm 3 to the hole portion 33 in a predetermined direction by a width smaller than the diameter of the hole portion 33.

The upper arm 3 is rotated about the pivot 11 in response to the projection and retraction of the lower arm 2, so that the panel 4 is opened and closed with laid upward.

The panel 4 has a display 41 for displaying an image at the front, and is openably/closably disposed on the front side of the main body unit 1. The post portion 42*a* for connection to the connecting portion 21 is provided at the lower portion on the opposed sides of the panel 4, and the post portion 42*b* for connection to the connecting portion 31 is provided at the upper portion thereof.

As shown in FIG. 2, the post portion 42*a* (42*b*) is formed of resin, and includes a shaft 43*a* (43*b*) which is attachable to/detachable from the hole portion 22 (33) through the shaft insertion portion 23 (34) only from a predetermined direction when the upper and lower arms 2 and 3 are projected to an extent not normally used, and a fixing portion 44*a* (44*b*) formed at both ends of the shaft 43*a* (43*b*). The cross section of the shaft 43*a* (43*b*) is formed in a oval shape having a transverse dimension smaller than the width of the shaft insertion portion 23 (34) and a longitudinal dimension substantially equal to the diameter of the hole portion 22 (33). In addition, the shaft 43*a* (43*b*) is formed longer than a thickness of the arm 2 (3). Further, the fixing portion 44*a* (44*b*) is formed to have a diameter larger than that of the hole portion 22 (33) to prevent the arm 2 (3) from coming off the panel 4 by sandwiching the arm 2 (3) therebetween.

Incidentally, the shaft 43*a* of the post portion 42*a* and the shaft 43*b* of the post portion 42*b* are mounted on the panel 4 in such a manner as to be oriented differently from each other. The orientation of the shaft 43*a* (43*b*) is set to coincide with that of the shaft insertion portion 23 (34) when the post portion 43*a* (43*b*) is connected to the connecting portion 21 (31) in the assembly of the panel 4 and the upper and lower arms 2 and 3 as mentioned below.

Next, the assembly of the panel 4 and the upper and lower arms 2 and 3 of the display device thus constructed will be described.

Figure 4:
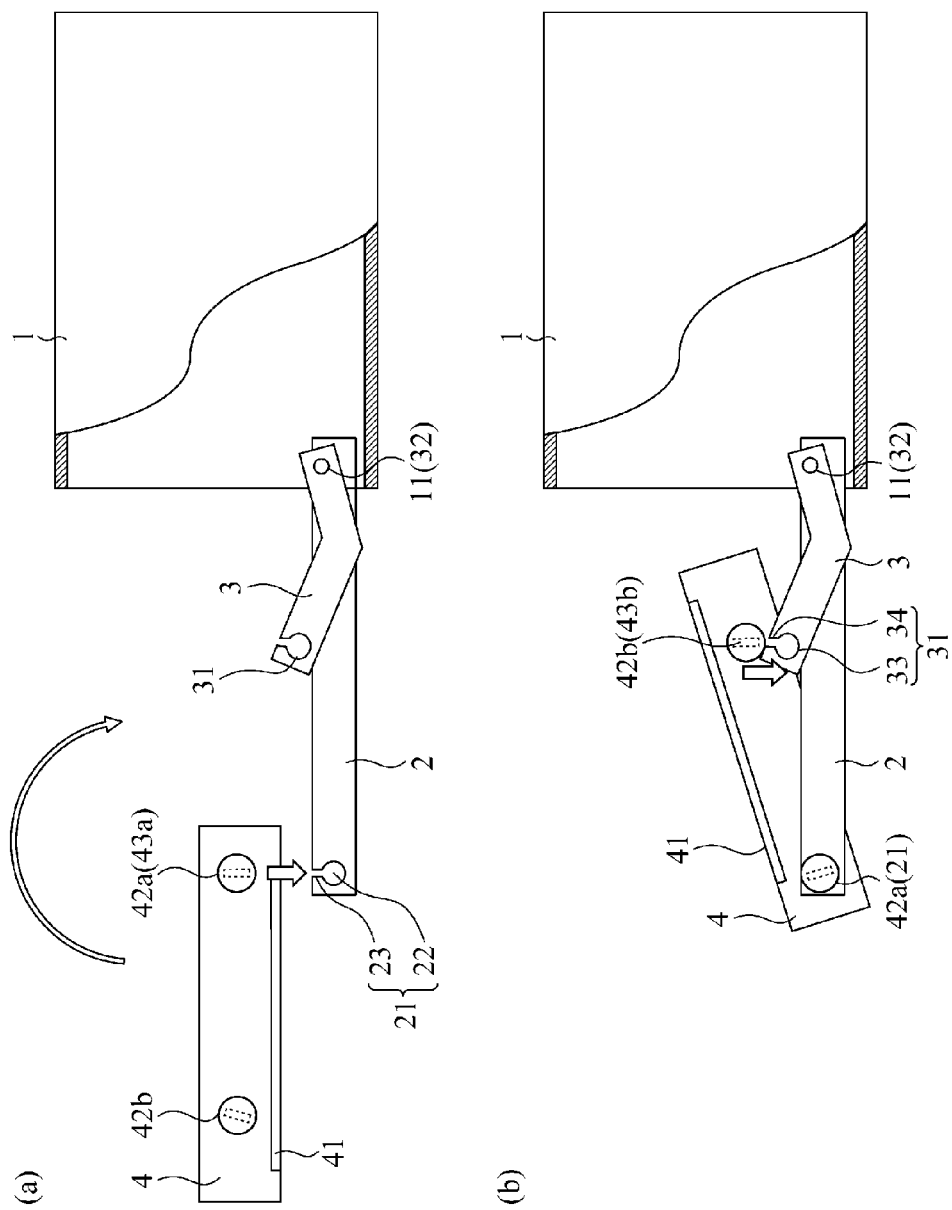
FIG. 4 illustrates an assembly of the panel and arms in the first embodiment of the invention.

First, as shown in FIG. 4(*a*), when the lower arm 2 is projected excessively as the projecting portion 24 is pressed through the window 13, the excessive projection preventing mechanism is released to allow the upper and lower arms 2 and 3 to be projected to an extent not normally projected. In this situation, the display 41 surface of the panel 4 is oriented downward, and the orientation of the shaft 43*a* of the post portion 42*a* is adapted to be coincident with that of the shaft insertion portion 23 of the connecting portion 21. Thereafter, the shaft 43*a* is fitted into the hole portion 22 through the shaft insertion portion 23.

Then, as shown in FIG. 4(*b*), the panel 4 is rotated upwardly about the post portion 42*a* to orient the display 41 surface upward. At this time, the oval-shaped shaft 43*a* of the post portion 42*a* is also rotated within the hole portion 22, so that the orientation of the shaft insertion portion 23 is not coincident with that of the post portion 42*a* any more, which prevents the post portion 42*a* from coming off the connecting portion 21. On the other hand, the orientation of the shaft 43*b* of the post portion 42*b* becomes coincident with that of the shaft insertion portion 34 of the connecting portion 31 by the rotation of the panel 4.

Then, the shaft 43*b* is fitted into the hole portion 33 through the shaft insertion portion 34. Thereafter, the lower arm 2 is retracted into the main body unit 1. At this time, the upper arm 3 is rotated about the pivot 11 toward the main body unit 1, and the oval-shaped shaft 43*b* of the post portion 42*b* is rotated within the hole portion 33, so that the orientation of the shaft insertion portion 34 is not coincident with that of the shaft 43*b* any more, which prevents the post portion 42*b* from coming off the connecting portion 31.

According to the above, the panel 4 and the upper and lower arms 2 and 3 can be assembled.

It is to be noted that when the lower arm 2 is retracted into the main body unit 1, the excessive projection preventing mechanism functions to prevent the upper and lower arms 2 and 3 from projecting to the extent not normally used; thus, no panel 4 comes off from the upper and lower arms 2 and 3.

Next, the detachment of the panel 4 from the upper and lower arms 2 and 3 will be described.

First, when the lower arm 2 is excessively projected as the projecting portion 24 is pressed through the window 13, the excessive projection preventing mechanism is released to project the upper and lower arms 2 and 3 to the extent not normally used. At this time, the orientation of the shaft 43*b* is conformed to that of the shaft insertion portion 34. Thereafter, the post portion 42*b* is detached from the connecting portion 31.

Then, the panel 4 is rotated about the post portion 42*a* to orient the display 41 surface downward. At this time, the orientation of the shaft 43*a* is brought to be coincident with that of the shaft insertion portion 23. Thereafter, the post portion 42*a* is removed from the connecting portion 21.

According to the above, the panel 4 can be removed from the upper and lower arms 2 and 3.

As described above, according to the first embodiment of the invention, it is configured that the connecting portion 21 (31) including the hole portion 22 (33), and the shaft insertion portion 23 (34) that is cut in from the edge of the arm 2 (3) to the hole portion 22 (33) by the width smaller than the diameter of the hole portion 22 (33) is formed at the end portion of the arm 2 (3), such that the upper and lower portions on the side of the panel 4 are provided with the post portion 42*a* (42*b*) including the shaft 43*a* (43*b*) which is attachable to/detachable from the hole portion 22 (33) through the shaft insertion portion 23 (34) only from the predetermined direction when the upper and lower arms 2 and 3 are projected to the extent not normally used, and the fixing portion 44*a* (44*b*) formed at both ends of the shaft 43*a* (43*b*) by the diameter larger than that of the hole portion 22 (33); thus, the assembly of the panel 4 and the upper and lower arms 2 and 3 can be easily performed, which makes it possible to reduce the number of man-hours in the assembly of the product.

On the other hand, when the panel 4 is removed from the upper and lower arms 2 and 3, the work can be easily carried out; thus, the maintainability can be improved. Further, conventionally used screws are eliminated, so that the number of parts can be reduced; thus, the cost can be lowered.

It is to be noted that in the display device of the first embodiment, in order to prevent the excessive projection of the lower arm 2, it is configured that the excessive projection preventing mechanism is provided therewith; however, since a projecting/retracting distance of the lower arm 2 is calculated from the number of revolutions of a motor, it may be configured that the excessive projection of the lower arm 2 is restricted in such a manner that the number of revolutions of the motor is controlled by a control section (not shown).

In addition, in the display device of the first embodiment, the post portion 42a (42b) is formed of resin; however, it may be configured that the post portion 42a (42b) is formed of metal, and that a separate resin part is attached to the hole portion 22 (33) and the shaft insertion portion 23 (34).

Further, in the display device of the first embodiment, it is configured that the shaft 43a (43b) of the post portion 42a (42b) has an oval shape in cross section, which is not limited thereto; the shaft 43a (43b) may be of any shape that is attached to/detached from the hole portion 22 (33) through the shaft insertion portion 23 (34) only from the predetermined direction when the upper and lower arms 2 and 3 are projected to the extent not normally used. For example, the shaft may be formed in a D-shape in cross section that has a transverse dimension which is smaller than the width of the shaft insertion portion 23 (34), and a longitudinal dimension which is larger than the width of the shaft insertion portion 23 (34).

Figure 5:
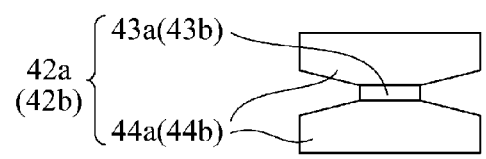
FIG. 5 is a top plan view showing another configuration of the post portion in the first embodiment of the invention.

Furthermore, in the display device of the first embodiment, a gap between the fixing portion 44a (44b) of the post portion 42a (42b) is illustrated in parallel; however, as shown in FIG. 5, the fixing portion 44a (44b) may be formed in such manner that the gap between the fixing portion 44a (44b) is widened outwardly; the fixing portion 44a (44b) may be tapered toward the shaft 43a (43b). In this case, the shaft 43a (43b) is made shorter than the thickness of the arm 2 (3). With the fixing portions 44a (44b) thus tapered, rattling that occurs when the post portion 42a (42b) is in the position fitted in the hole portion 23 (33) can be suppressed.

INDUSTRIAL APPLICABILITY

In the display device of the present invention, the assembly of the panel and the arms can be easily carried out, and the number of man-hours in the assembly of the product can be reduced. Further, since the maintainability can be improved, the display device is suitable for use in a display device with an openable/closable panel and like.

The invention claimed is:

1. A display device comprising:
   a lower arm having an end portion in which a connecting portion is formed to be projected from and retracted into a main body unit;
   an upper arm having an end portion in which a connecting portion is formed, and another end portion rotatably supported by the main body unit; and
   a panel with a side having a lower portion provided with a post portion for connection to the connecting portion of the lower arm is provided, and an upper portion provided with a post portion for connection to the connecting portion of the upper arm, the panel being openably/closably disposed on a front side of the main body unit,
   wherein both the connecting portions include a hole portion, and a shaft insertion portion that is cut in from an edge of the arm to the hole portion by a width smaller than a diameter of the hole portion, and
   wherein both the post portions include a shaft that is attachable to/detachable from the hole portion through the shaft insertion portion only from a predetermined direction when the upper and lower arms are projected to an extent not normally used, and a fixing portion formed at both ends of the shaft having a diameter larger than a diameter of the hole portion.

2. The display device according to claim 1, wherein the shafts of the post portions are oriented differently from each other at the upper and lower portions of the panel.

3. The display device according to claim 1, wherein an abutment portion is formed in the main body unit, and the lower arm is provided with an excessive projection preventing member to be abutted against the abutment portion when the lower arm is projected excessively.

4. The display device according to claim 1, wherein the lower arm is restricted from projecting excessively by a control section for controlling projecting and retracting operations thereof.

5. The display device according to claim 1, wherein the cross section of the shaft is formed in a shape with a transverse dimension which is smaller than a width of the shaft insertion portion and a longitudinal dimension which is larger than the width of the shaft insertion portion.

6. The display device according to claim 1, wherein the shaft is formed shorter than a thickness of the arm, and the fixing portions of the post portion are each tapered toward each other.

* * * * *